May 26, 1964  J. J. ZICCARDI  3,134,404
ELECTRO-MAGNETICALLY OPERATED FLOATING ARMATURE VALVES
Filed Feb. 27, 1961  3 Sheets-Sheet 1

INVENTOR.
John J. Ziccardi
BY William B. Jaspert
Attorney.

May 26, 1964 J. J. ZICCARDI 3,134,404
ELECTRO-MAGNETICALLY OPERATED FLOATING ARMATURE VALVES
Filed Feb. 27, 1961 3 Sheets-Sheet 2

INVENTOR.
John J. Ziccardi
BY William D. Jaspert
Attorney.

May 26, 1964    J. J. ZICCARDI    3,134,404
ELECTRO-MAGNETICALLY OPERATED FLOATING ARMATURE VALVES
Filed Feb. 27, 1961    3 Sheets-Sheet 3
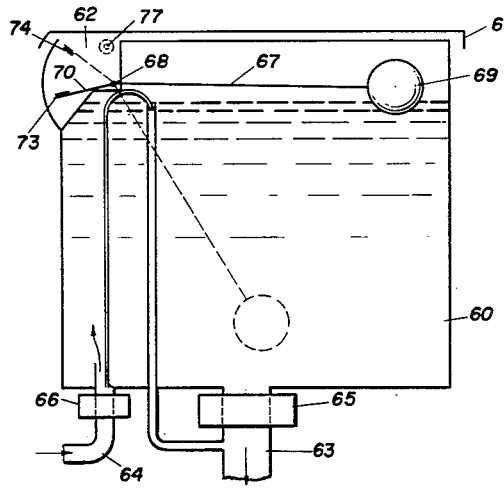
FIG-11
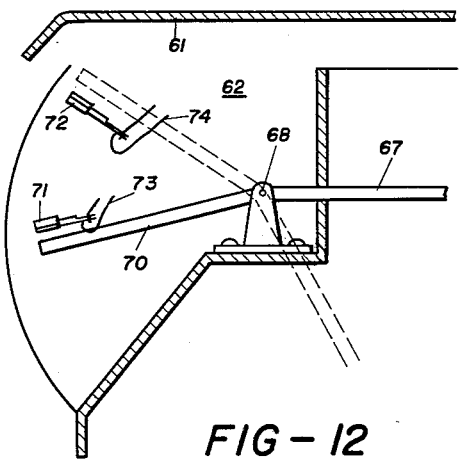
FIG-12
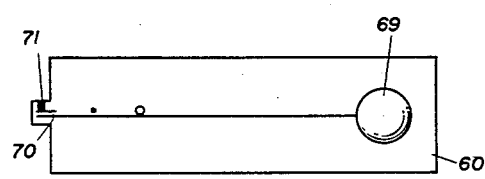
FIG-13
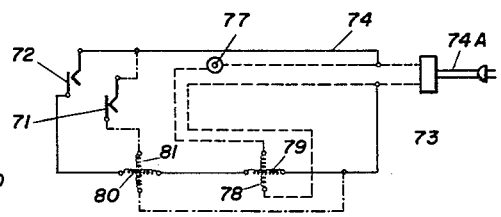
FIG-14
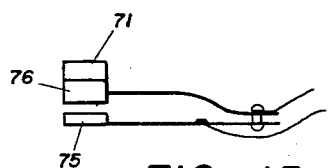
FIG-15
FIG-16
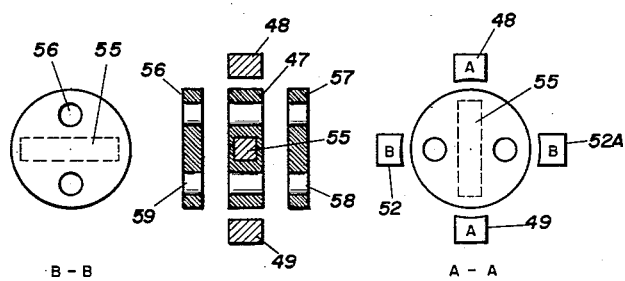
FIG-17
INVENTOR.
John J. Ziccardi
William B. Jaspert
BY
Attorney.

United States Patent Office 3,134,404
Patented May 26, 1964

3,134,404
ELECTRO-MAGNETICALLY OPERATED
FLOATING ARMATURE VALVES
John J. Ziccardi, Marshall Road, R.D. 1, Evans City, Pa.,
assignor of fifty percent to William B. Jaspert, Pittsburgh, Pa.
Filed Feb. 27, 1961, Ser. No. 105,837
5 Claims. (Cl. 137—625.31)

This invention relates to new and useful improvements in flow control mechanism and systems, more particularly to magnetically operated rotary valves, and it is among the objects thereof to provide valves that are leakproof and noiseless in their operation and which may be manually operated or adapted for remote control.

It is a further object of the invention to provide valve mechanism employing a magnetic field to rotate the same, which may be of the permanent type or electromagnetically operated.

It is a further object of the invention to provide flow systems such as water closets for lavatories employing such electromagnetically operated and electrically controlled valves that are subject to flow opening and closing movement by rotation only, such a flow system being silent and leak-proof in its operation.

These and other objects of the invention will become more apparent from a consideration of the accompanying drawings constituting a part hereof in which like reference characters designate like parts and in which.

Figure 1:
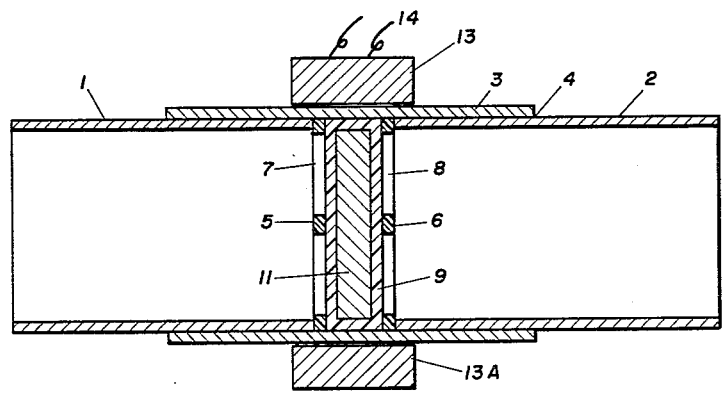
FIGURE 1 is a cross-sectional view of a plurality of pipe sections, a connecting sleeve and valve mechanism diagrammatically illustrating the principles of this invention.
Figure 3:
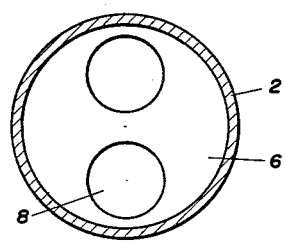
Figure 6:
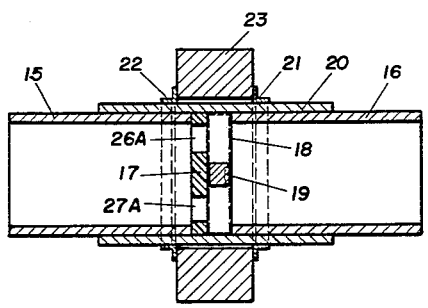
Figure 4:
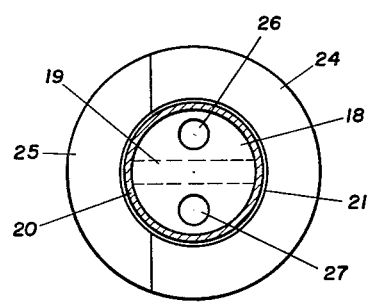
Figure 5:
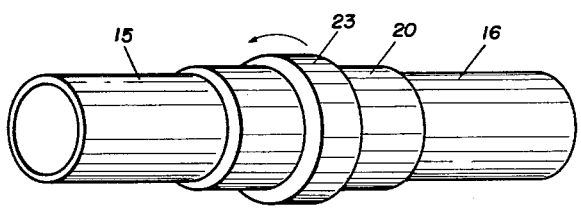
Figure 8:
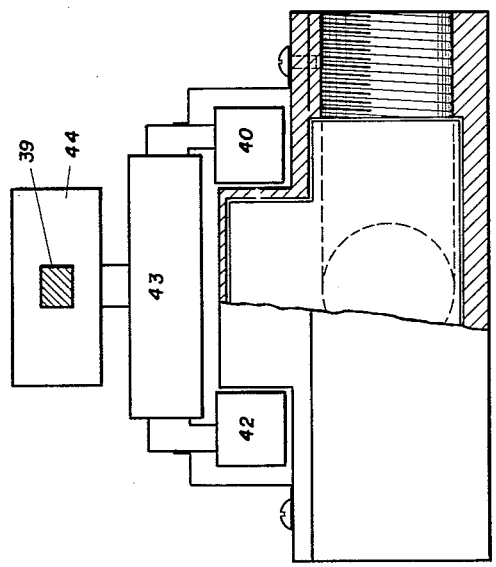
Figure 10:
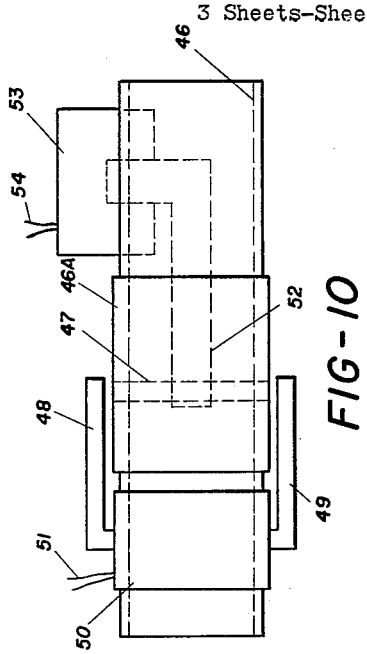
Figure 7:
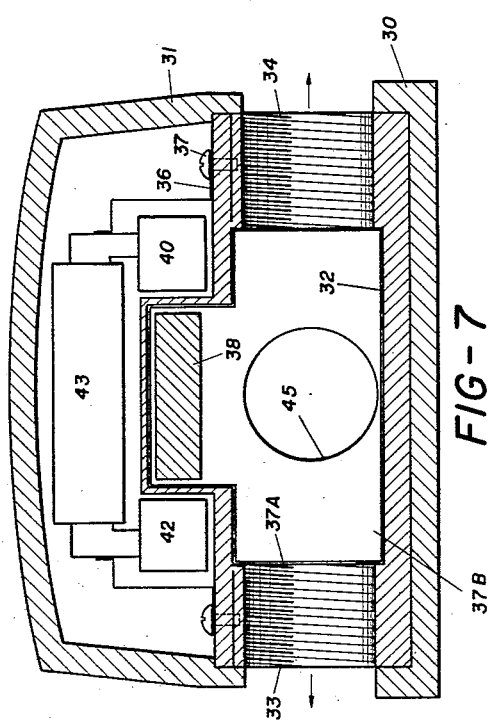
Figure 9:
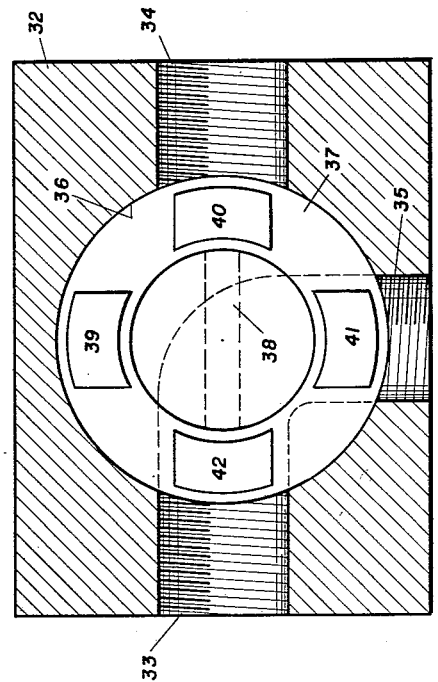

FIGURE 3, a similar view of a pipe section and partition member;

FIGURE 4, a cross-sectional view of a manually operable valve with a magnetic operator in end elevation;

FIGURE 5, a view in perspective of the valve shown in FIGURE 4;

FIGURE 6, a cross section of the valve shown in FIGURES 4 and 5;

FIGURE 7 is a cross-sectional view, partially in elevation, of an electrically operated valve embodying the principles of this invention;

FIGURE 8, a side elevational view of the valve shown in FIGURE 7 with the cover removed;

FIGURE 9, a top plan view, partially in section, of the valve shown in FIGURES 7 and 8;

FIGURE 10, an electrically controlled shut-off valve embodying the principles of this invention;

FIGURE 11, a flow control system comprising a water closet for lavatories employing electromagnetic valves with electrical controls;

FIGURE 12, an enlarged detail of the control chamber of the tank of FIGURE 11;

FIGURE 13, a top plan view diagrammatically illustrating a float and float arm;

FIGURE 14, a wiring diagram of a push-button and operating switch control;

FIGURE 15, an enlarged detail diagrammatically illustrating the electrical contacts in side elevation;

FIGURE 16, an end view diagrammatically illustrating the switch arm passing into engagement with the electrical contacts operated by the float arm; and FIGURE 17, an exploded view diagrammatically illustrating the open and closed position of the valves employed in the structure of FIGURES 1, 7 and 10.

Figure 2:
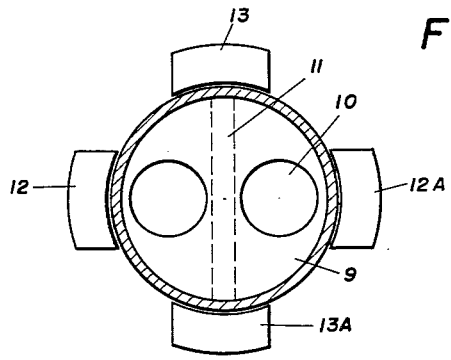
FIGURE 2 is an end elevational view diagrammatically illustrating the structure of FIGURE 1.

With reference to FIGURES 1 to 3 of the drawing, the numerals 1 and 2 designate pipe sections joined by a sleeve 3 and sealed in the space 4 between the sleeve and pipe sections. The ends of the pipe sections 1 and 2 are provided with walls 5 and 6 having openings 7 and 8. Disposed in the space between the walls 5 and 6 is a disc-shaped rotary valve 9 of non-magnetic properties having openings or flow passages 10 and disposed within the rotatable disc 9 is a bar magnet 11. Disposed around the connecting sleeve 3 are a plurality of electromagnets having poles 12—12a and 13—13a. These magnets are energized by suitable circuits 14, FIGURE 1, which may be energized by remote control either manually or in response to other movable elements, as will be hereinafter described.

In the form of valve shown in FIGURES 4, 5 and 6, pipe sections 15 and 16 are diagrammatically shown with an end wall 17 and a rotatable valve disc 18 having a bar magnet 19. The connecting sleeve 20 is provided with flange rings 21 and 22 between which is mounted a rotatable ring 23 of a construction shown in FIGURE 4; namely, a portion 24 is made of a permanent magnet and a portion 25 is made of a non-magnetic material. The disc valve 18 is shown with flow passages 26 and 27. By rotating the magnetic ring 23, the bar 19 is made to align itself with the magnetic field of the ring portion 24 until the flow passages 26 and 27 register with corresponding flow passages 26a and 27a in the end wall 17 which is like the walls 5 and 6 in FIGURE 1 of the drawing.

A heavy-duty type of electromagnetic valve is shown in FIGURES 7, 8 and 9 of the drawing. It consists of a housing having a base portion 30 and a cover portion 31. The base portion 30 may be of lead to prevent stray radioactive emission in piping systems carrying radioactive materials. A valve body portion 32 is provided with threaded connections 33, 34 and 35, and a top 36 fastened by screws 37, FIGURE 7. It is also provided with a cylindrical bore or valve chamber 37a in which is disposed the rotary valve element 37b, preferably of non-magnetic material, which is provided with a magnetic bar 38. The bar 38 is either aligned with the flow passage 45 or is at an angle of 90°, as shown in FIGURE 7. In alignment with the bar 38 are pole pieces 39, 40, 41 and 42 of a pair of electromagnets energized by coils 43 and 44, FIGS. 7 and 8. The pole pieces are arranged so that the fields of the separate electromagnets will be at 90° in relation to each other and on a plane with the bar magnet 38. Each electromagnet is energized separately by suitable switches, or automatic relays in electrical circuits to cause a strong magnetic field to surround the magnetic bar 38 thereby controlling the position of the rotary valve 37b. The rotary valve element 37 is provided with an L-shaped flow passage 45 which, by energizing bar 38, may be brought into alignment with either the threaded connection 34 or 35 to direct the flow of gas or fluid from the connection 35, FIGURE 9, to either the connection 33 or 34.

FIGURE 10 diagrammatically illustrates another form of an electrically controlled leak-proof shutoff valve which is connected in a flow line to have gas or liquid flow through the passage 46 extending axially from end to end through the valve. The rotary valve 47, diagrammatically shown, has the magnetic bar like the bar 11 and the bar 19 of FIGURES 2 and 5, respectively, of the drawing and the valve 47 is actuated to rotate to its open and closed position by magnetic pole pieces 48 and 49 energized by a coil 50 connected in a control circuit by the conductors 51 and the pole pieces 52 energized by coil 53 connected to a control circuit by the conductors 54. By energizing one or the other of the coils 50 and 53, the valve 47 is turned to its open or closed position by virtue of the magnetic bar, not shown, aligning itself with the magnetic field of the pole pieces. The construction of the valve portion of FIGURE 10 is diagrammatically illustrated in the exploded view of FIGURE 17 in which the numeral 55 designates the magnetic bar and the numerals 56 and 57 the end walls or partitions in the valve body 46a, FIGURE 10, having flow passages 58 and 59. In the open position, the valve of FIGURE 17 is shown with the magnetic bar 55 horizontally disposed, whereas in the closed position so designated in FIGURE 17 of the drawing, the magnetic bar 55 is vertically disposed, as shown.

An application for the type of valve herein disclosed is demonstrated in connection with FIGURES 11 through 16 of the drawings. The flow system, as shown in FIGURE 1, is a water closet for lavatories in which the numeral 60 is the water tank, 61 a cover diagrammatically shown, a vented dry chamber 62 being provided in the upper lefthand corner of the tank to constitute a switch box, as will be hereinafter described. The water tank 60 is provided with an outlet pipe 63 that goes to the lavatory and a water inlet pipe 64, the outlet and inlet pipes being provided with electromagnetic valves 65 and 66, respectively, of the type shown in FIGURES 1 to 3 and 17, for example. Numeral 63a designates a conventional overflow pipe. Mounted in the tank is an arm 67 pivoted at 68 having a float ball 69 at one end and having a switch arm 70 at the other, the switch arm being non-conducting and knife-shaped as shown in the upper portion of FIGURE 16. As shown in FIGURE 12, a pair of switches 71 and 72 are disposed in the path of switch arm 70 and are electrically connected by conductors 73 and 74 to an electrical power circuit by a plug 74a shown in FIGURE 14 of the drawing.

As shown in FIGURE 15, the switches 71 and 72 have stationary contacts 75 and movable contacts 76, the latter being in the path of movement of switch arm 70 and are knife shaped, as shown in FIGURE 16, to be engaged by the knife edge of switch arm 70 to make momentary contact with 75 when the switch arm moves through the arc determined by the travel of the switch arm when the float 69 drops from the horizontal position to the dotted line position in FIGURE 11. The system operates on five short surges of electric current, as will be seen from a description of the wiring diagram of FIGURE 14. A pushbutton switch 77 is included in the electrical circuit of FIGURE 14 and energizes the coil 78 of the flushing valve 65 which opens the valve.

Valve 65 is also provided with coil 79, which is connected to contact 72 and closes valve 65 when arm 70 closes contact 72. Inlet valve 66 is provided with coils 80 and 81 and coil 80 is energized to open the inlet valve 66 when contact 72 closes valve 65. When the tank is full, switch arm 70 will pass over contact 71 and close the same to energize coil 81 which closes valve 66 and the system is ready to repeat the flushing cycle when pushbutton 77 is again depressed.

The knife shape edge of the non-conductor arm 70 and that of the contacts 71 and 72 prevents the arm from resting on the contacts and allows the arm 70 to just pass over them, as shown in FIGURE 16. In the event of water supply failure, arm 70 would come to rest above contact 72 and all electric circuits would remain broken because the float 69 could not rise. There is therefore no danger of fire or damage to windings of coils since arm 70 cannot rest on knife edge contacts.

There is no rubber valve seat or ball seat that leaks and causes a continuous flow of water to the tank, as in conventional types of water tanks and flow devices, and there is no mechanical linkage that rattles in the operation of the flushing mechanism.

It will be evident from the foregoing description of the invention that electrical valves made in accordance therewith may be employed in electrically controlled fluid systems and also in manually operated fluid systems. Such valves are leak-proof and may be employed with other available electric components to effect automatic or remote control of fluid systems. It is also evident that the magnetic materials used in the valve such as the magnetic bars may be either a permanent bar magnet or a bar of pure iron which is adapted to align itself with magnetic fields of electromagnetic pole pieces.

While the invention has been demonstrated as applied to water tanks of lavatories, it has many other uses, as for example, such valves prevent stray magnetic currents from interfering with the valve operations and they can be used in flow systems to prevent radioactive particles from escaping, since there are no joints and the valves are absolutely foolproof.

It is apparent that the electromagnetic bar valve may be used with a single or multiple partition walls having flow passages for alignment with flow passages in the valve rotor and the bar magnet may be employed in sliding engagement with a flow passage partition or in any other manner to respond to electromagnetic forces in its flow controlling movements within the scope of the appended claims.

Although one embodiment of the invention has been herein illustrated and described, it will be evident to those skilled in the art that various modifications may be made in the details of construction without departing from the principles herein set forth.

I claim:

1. In an electromagnetic valve, a housing having a flow passage and a rotary valve disc with flow openings, partitions on opposite sides of said valve disc dividing said flow passage and having flow openings, said valve disc having a magnetic bar, and electro-magnetic coils having magnetic poles for maintaining lines of magnetic flux to selectively direct said bar to move the flow openings of the valve disc in and out of alignment with the flow openings of said partitions.

2. In a magnetically operated valve a housing having a flow passage for connection with a fluid flow system, a rotary valve in said housing having a flow opening for alignment with said passage and having a bar magnet in the body of the valve to establish lines of magnetic flux transversely of the flow of fluid in said passage and means for rotating a magnetic field around said valve to selectively act upon the lines of flux of said magnetically actuated bar to control the angular position of the flow opening of the rotary valve relative to said flow passage.

3. A valve as set forth in claim 2 in which the rotary valve is provided with means responsive to a directed magnetic field to rotate said valve through an arcuate path of predetermined distance.

4. A valve as set forth in claim 2 in which the magnetic bar is at an angle of 90° to the flow passage through the valve body.

5. A valve as set forth in claim 2 in which the poles of the electro-magnetic coils are spaced to position the flow opening of the valve body in predetermined angular positions relative to the flow connections of said valve housing.

References Cited in the file of this patent

UNITED STATES PATENTS

| | | |
|---|---|---|
| 1,301,327 | Slate | Apr. 22, 1919 |
| 2,412,452 | Green | Dec. 10, 1946 |
| 2,717,396 | Chiles | Sept. 13, 1955 |
| 2,881,450 | Tubbs | Apr. 14, 1959 |
| 2,974,923 | Herman | Mar. 14, 1961 |